3,686,215
PRODUCTION OF 5,6,7,7a-TETRAHYDRO-
INDAN-5-ONES
Clive A. Henrick, Palo Alto, John A. Edwards, Los Altos, and John H. Fried, Palo Alto, Calif., assignors to Syntex Corporation, Panama, Panama
No Drawing. Filed Mar. 27, 1969, Ser. No. 811,236
Int. Cl. C07d 7/04, 13/04, 73/00
U.S. Cl. 260—327 M
7 Claims

ABSTRACT OF THE DISCLOSURE

Preparation of $\alpha,\beta$-unsaturated carbocyclic ketones by reacting a $\delta$-keto carboxylic acid ester, anhydride or acyl halide with a carbanion generated by treating a methylphosphonate with base. The reaction is useful for producing intermediates for synthesis of known steroids having estrogenic, progestational, or anabolic activity, for example.

---

This invention relates to the production of unsaturated carbocyclic ketones. More particularly, this invention relates to a novel process for converting $\delta$-keto carboxylic acid esters, anhydrides, or acyl halides into $\alpha,\beta$-unsaturated carbocyclic ketones.

The expression "$\delta$-keto carbocyclic acid," as used herein, refers to cyclopentylpropionic acid compounds having a keto group and the propionic acid group attached to adjacent carbon atoms of a cyclopentyl ring. The expression "$\alpha,\beta$-unsaturated carbocyclic ketones," as used herein, refers to carbocyclic ketones having $\alpha,\beta$-ethylenic unsaturation with respect to the keto group.

Prior to this invention, $\alpha,\beta$-unsaturated carbocyclic ketones were produced from keto carboxylic acids by a multi-step process which involved converting the keto carboxylic acid to the corresponding enol lactone by treatment with acetic anhydridesodium acetate, reacting the enol lactone with a Grignard reagent, for example, methyl magnesium chloride, to open the lactone ring, and thereafter cyclizing the thus-obtained diketonic intermediate product by treatment with acid or alkali to obtain the carbocyclic ketone. See, for example, U.S. Pats. 3,057,907 and 3,321,489 and French Pat. 1,359,675.

The principal object of this invention, therefore, is to provide an improved process for producing $\alpha,\beta$-unsaturated carbocyclic ketones from keto carboxylic acid esters, anhydrides, or acyl halides which overcomes the aforementioned disadvantages. Another object of this invention is to provide a process for producing $\alpha,\beta$-unsaturated carbocyclic ketones which is economical and simple to operate.

Another object of this invention is to provide a singlestep process for producing $\alpha,\beta$-unsaturated carbocyclic ketones. Still another object of this invention is to provide a process for producing $\alpha,\beta$-unsaturated carbocyclic ketones which is useful in the total synthesis of steroids and novel intermediates therefore.

In general, the process of this invention is a method for producing $\alpha,\beta$-unsaturated carbocyclic ketones which comprises reacting, under anhydrous conditions in an inert organic solvent, a lower alkyl ester, aryl ester having up to 10 carbons in the aryl group, lower alkylthio ester, lower alkylcarboxylic acid anhydride, or acyl halide of a 2-oxo-1-cyclopentylpropionic acid with a carbanion generated by reacting a phosphonate with a base, said phosphonate being represented by the formula

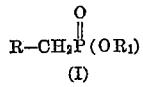

(I)

R is selected from the group consisting of hydrogen and substituted and unsubstituted, saturated and unsaturated, aliphatic, carbocyclic and carbocyclic-aliphatic radicals, and $R_1$ is selected from the group consisting of substituted and unsubstituted, saturated and unsaturated, aliphatic and carbocyclic radicals and lower alkoxy radicals. About two molar equivalents of said phosphonate is present for each mole of said 2-oxo-1-cyclopentylpropionic acid ester, anhydride or acyl halide.

The phosphonates which are useful in the production of $\alpha,\beta$-unsaturated carbocyclic ketones in accordance with the process of the present invention are the methylphosphonates illustrated by the following formula

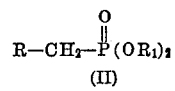

(II)

wherein R is selected from the group consisting of hydrogen and substituted and unsubstituted, saturated and unsaturated, aliphatic, carbocyclic and carbocyclic-aliphatic radicals, and $R_1$ is selected from the group consisting of substituted and unsubstituted, saturated and unsaturated, aliphatic, carbocyclic and carbocyclic-aliphatic radicals.

Phosphonates of Formula I above can be prepared, for example, by reaction of a di-substituted phosphite A with an organic halide or sulfonate of the Formula B, respectively, in the presence of a base, e.g. sodium hydride,

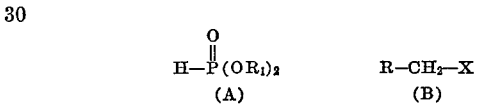

In the above formulas, R and $R_1$ are as defined above and X is chloro, bromo or $OSO_2R'$, wherein $R'$ is alkyl or aryl. The formation of the phosphonates can be carried out in inert solvents such as ether, tetrahydrofuran, monoglyme, diglyme, or dioxane and preferably in an oxygenfree atmosphere. The method of preparing the phosphonates is not part of the present invention. A suitable procedure for the formation of methylphosphonates useful in the present invention is to react a di-substituted phosphite of Formula A with an organic halide or sulfonate of Formula B in an inert solvent in the presence of about one equivalent of a base such as sodium hydride under an inert atmosphere at a temperature of about $-10°$ C. to about room temperature. Other methods are described, for example, in U.S. Pat. 2,754,319.

While the methylphosphonates which can be employed in the process of the present invention are too numerous to list here, they can be exemplified by the following:

dimethyl methylphosphonate
dimethyl ethylphosphonate
diethyl benzylphosphonate
diethyl methylphosphonate
dicyclohexyl methylphosphonate
diphenyl methylphosphonate
di-(n-butyl) methylphosphonate
dibenzyl methylphosphonate
diethyl 4,4-dimethoxybutylphosphonate
diethyl 4,4-ethylenedioxypentylphosphonate
dimethyl 4,4-dimethoxy-3-methylbut-2-enylphosphonate
diethyl 4-chloropent-3-enylphosphonate
diethyl 4-(tetrahydropyran-2-yloxy)pentylphosphonate
diethyl 4,4-ethylenedioxy-3-methylpentylphosphonate
di(methoxyethyl)methylphosphonate
di(2-ethylhexyl)methylphosphonate
di(n-octyl)ethylenephosphonate
di(ethoxyethyl)methylphosphonate In the practice of the process of the present invention, a phosphonate of Formula I is reacted with a base to generate the corresponding carbanion of the Formula I':

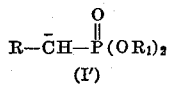
(I')

Because of the general instability of the phosphonate carbanion, it is necessary that the reaction between the phosphonate and base be carried out at a low temperature of the order of about −150° C. to about −20° C., preferably about −100° C. to about −40° C. After formation of the carbanion is complete, the low temperature of the reaction mixture is maintained during the addition of the ester, anhydride, or acyl halide keto carboxylic acid compound and thereafter the cooling means is removed or the reaction temperature is raised by other means to about room temperature. Suitable bases for generating the carbanion include organo alkali metal compounds such as alkyl or aryl lithium, sodium or potassium (e.g. n-butyl lithium, phenyl lithium, methyl sodium, methyl potassium, methyl lithium, tolyl lithium, methyl potassium, lithium pyridide, and the like); alkali metal hydrides such as sodium hydride, potassium hydride or lithium hydride; and alkali metal amides such as sodamide, and the like.

Preferred phosphonates for use in the process of this invention ar substituted propylphosphonates which can be represented by Formula II:

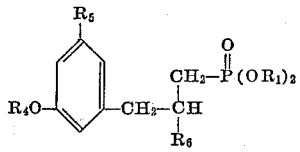

wherein $R_4$ is lower alkyl or other similar alkaline-stable, acid-labile protecting group, $R_5$ is hydrogen or lower alkoxy, $R_6$ is hydrogen or methyl and $R_1$ is as defined above.

The preferred phosphonates and a method for their preparation have been described in U.S. patent application Ser. No. 747,465 filed July 25, 1968. The method can be generally illustrated by the following representative procedure wherein X is bromo, chloro or aryl or alkyl sulfonyloxy and $R_1$, $R_4$, $R_5$ and $R_6$ are as defined above.

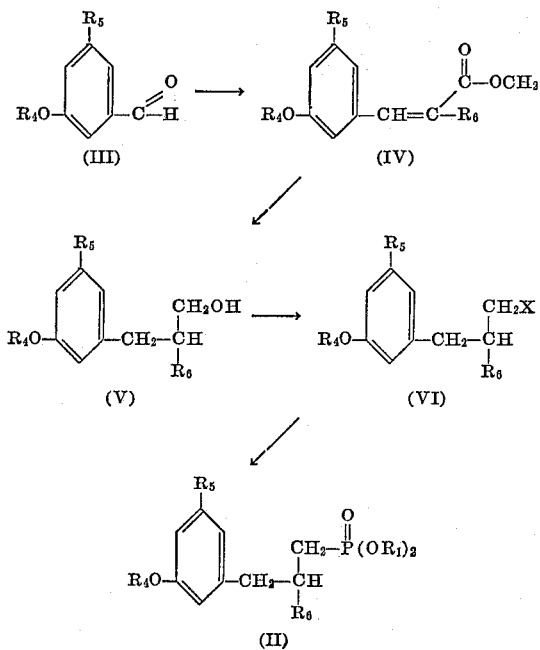

The aldehyde (III) is reacted with methyl α-bromoacetate or methyl α-bromopropionate in an inert anhydrous solvent such as benzene in the presence of zinc dust and then refluxed in the presence of p-toluene sulfonic acid to yield the ester (IV). The ester is then hydrogenated, for example using a 5 percent palladium-on-carbon catalyst in ethanol to yield the corresponding saturated ester. Reduction of the saturated ester, for example with lithium aluminum hydride in tetrahydrofuran, yields the corresponding alcohol (V). Reaction of the alcohol (V) with phosphorus trichloride or tribromide in an inert solvent such as benzene yields the corresponding halide (VI). Reaction of (VI) with a di-substituted phosphite

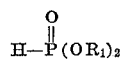

$R_1$ being as defined above, e.g. dimethyl phosphite, yields the corresponding phosphonate (II), for example, dimethyl 1-methoxy-3-phenylpropylphosphonate,
dimethyl 1,5-dimethoxy-3-phenylpropylphosphonate,
dimethyl 1-methoxy-3-phenyl-(2-methylpropyl) phosphonate,
dimethyl 1,5-dimethoxy-3-phenyl-(2-methylpropyl) phosphonate
and the like.

Other phosphonates useful in the process of this invention can be represented as follows:

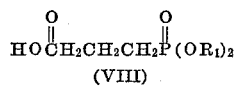
(VIII)

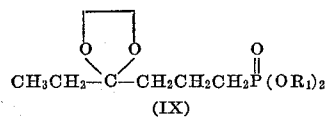
(IX)

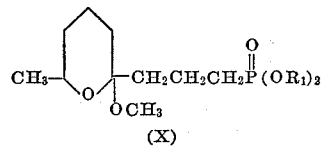
(X)

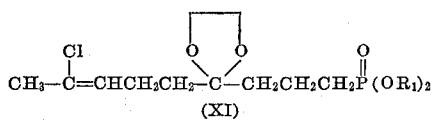
(XI)

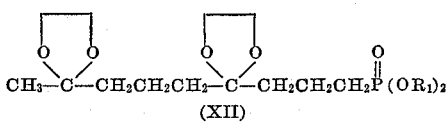
(XII)

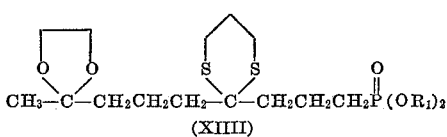
(XIII)

In the above formulas $R_1$ is as defined above.

The δ-keto carboxylic acid esters, anhydrides and acyl halides useful in the process of this invention include 2-oxo-1-cyclopentylpropionic acid esters, anhydrides and acyl halides represented by Formula XIV

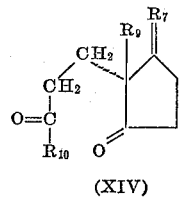
(XIV)

wherein $R_7$ is a suitably protected oxo group (protected with an alkaline-stable, acid-labile protecting group) such as lower alkenylenedioxy, e.g. ethylenedioxy or $$\begin{array}{c} OR_8 \\ |\cdots H \end{array}$$

wherein —$OR_8$ is an ether group such as lower alkoxy, e.g., methoxy, ethoxy, t-butoxy, or tetrahydropyran-2-yloxy, tetrahydrofuran-2-yloxy, or 4-methoxytetrahydropyran-4-yloxy and the like;

$R_9$ is lower alkyl; and $R_{10}$ is lower alkoxy, aryloxy (including phenylalkyleneoxy and alkylphenyleneoxy) having up to 10 carbons, lower alkylthio, lower alkanoyloxy, bromo or chloro, e.g., methoxy, ethoxy, butoxy, hexyloxy, phenoxy, benzyloxy, tolyloxy, phenylethyleneoxy, methylthio, ethylthio, butylthio, acetyloxy, propionyloxy, valeryloxy, and the like.

In general, the process of this invention can be represented by the following schematic diagram: wherein R, $R_1$, $R_7$, $R_9$ and $R_{10}$ are as defined above.

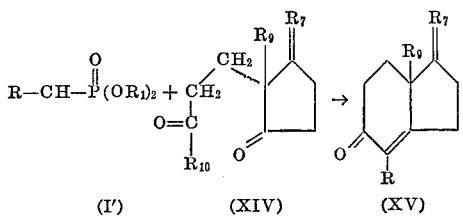

(I')    (XIV)    (XV)

In the process of the present invention, the reaction is carried out with from 1.2 to 2.5 and preferably about 2.1 moles of the di-substituted phosphonate per mole of the keto carboxylic acid compound of Formula XIV. More than 2.5 equivalents of the phosphonate can be used but it is generally disadvantageous to do so because in some cases the excess reagent may react further with the carbonyl group of the desired carbocyclic ketone.

Any organic solvent can be used for the reaction medium so long as it is inert to the reaction and reagents. Suitable organic solvents are set forth in the reference listed hereinabove and include ethers such as diethyl ether, tetrahydrofuran, dioxane, monoglyme, diglyme, and the like. The keto carboxylic acid compound can be introduced as a solution using the same solvent as that used for generating the carbanion. The reaction generally goes to completion in from about 0.5 hours to about 48 hours depending upon such factors as temperature and the relative reactivity of the carbanion and keto carboxylic acid compound. The reaction temperature can vary from about —150° C. to room temperature depending upon such factors as the stability of the carbanion, the relative reactivity of the carbanion and keto carboxylic acid compound being reacted, and the time in which it is desired to complete the reaction. After formation of the carbanion is complete and the keto carboxylic acid compound has been introduced, the reaction mixture temperature can be permitted to rise to about room temperature in order to complete the reaction in a shorter period of time. Depending upon the stability of the particular carbanion being used, the reaction mixture can be heated above room temperature, for example, reflux temperature, if still shorter reaction times are desired. However, because of the general instability of the carbanion, the reaction between the phosphonate and base must be carried out at low temperatures of the order of about —150° C. to —20° C.

There is formed an intermediate phosphonate which in some cases can also be isolated, if desired, or the reaction continued without interruption to form the α,β-unsaturated carbocyclic ketone. As shown more fully hereinafter, whether an intermediate phosphonate is formed that can be isolated is dependent upon the reactivity of the particular phosphonate carbanion and keto carboxylic acid compound being reacted, the solvent medium and the reaction temperature. If it is desired to isolate the intermediate phosphonate, it should generally be done before permitting the reaction to rise to warm temperature such as about 0° C. or lower by, for example, the addition of water followed by extraction with organic solvent such as ether, ethyl acetate, and the like. If it is not desired to isolate the intermediate phosphonate, the reaction can be continued without interruption or it can be continued more efficiently by the addition of a lower monohydric aliphatic alcohol such as methanol, ethanol, isopropanol, t-butanol, and the like, with or without the addition of a base such as an alkali metal alkoxide or hydroxide, for example, sodium methoxide, sodium ethoxide, sodium hydroxide, potassium hydroxide, potassium methoxide, sodium t-butoxide, and the like. The lower alcohol or an alcohol containing a base should be added after the initial reaction between the keto carboxylic acid compound and phosphonate carbanion is substantially complete. The addition can be made, e.g. after the reaction mixture has been allowed to rise to about 0° C. to room temperature or after the initial phosphonate has disappeared which can be followed by, e.g. thin layer chromatography. A part or all of the original solvent can first be removed, if desired, and the alcohol, with or without base, added thereafter. The amount of lower alcohol added should generally be such as to provide at least about 10% by volume of the total amount of solvent in the reaction mixture, preferably from about 25% to 80%. When the intermediate phosphonate is isolated, the amount of base added should generally be at least 1 molar equivalent. The most advantageous amount of base is easily determinable by routine experimentation giving consideration to the enol lactone, phosphonate and solvent being employed. In the case of solvents such as diglyme and monoglyme, if it is not desired to isolate the intermediate phosphonate, it has been found advantageous to add, after the initial reaction, from about 10% to 75%, preferably 25% to 50%, by volume of the total solvent, a dipolar aprotic solvent such as hexamethylphosphoramide, dimethylformamide, dimethylacetamide, and the like. A particularly preferred reaction solvent is diglyme. In the foregoing methods, when it is not desired to isolate the intermediate phosphonate, the efficiency of the reaction is generally increased by increasing the reaction temperature, after the initial reaction, to above room temperature, such as reflux temperature. For optimum results, it is important that the reaction be conducted under as near anhydrous conditions as possible and preferably under an inert oxygen-free atmosphere such as nitrogen, argon, and the like. While the concentration of the keto carboxylic acid compound and carbanion does not appear to be critical, it is preferred to operate at low concentrations of the order of about 2 to about 25% by weight of the reaction medium. The foregoing reaction conditions are largely dependent upon the particular phosphonate, base and keto carboxylic acid compound employed and are presented as a guide. Provided with the foregoing and the examples hereinafter, the most advantageous or optimum conditions and proportions of the keto carboxylic acid compound, phosphonate and base for a particular keto carboxylic acid compound are easily determinable by one of ordinary skill in the art using routine experimentation.

The term "lower alkyl" and derivations thereof such as "lower alkoxy," "lower alkylthio," "lower alkenoyloxy" and the like, as used herein, refer to saturated aliphatic hydrocarbon groups (or derivations thereof), branched or straight chain, containing one to six carbon atoms. The term "aryl" refers to phenyl and substituted phenyl, such as tolyl, chlorophenyl, methoxyphenyl, benzyl and the like.

Use of the process of this invention in the synthesis of estradiol and related estrogenic compounds is illustrated by the following procedures wherein $R_1$, $R_4$, $R_5$, $R_6$, $R_7$, $R_9$ and $R_{10}$ are as defined above, $R_5'$ is hydrogen or hydroxy, and $R_7'$ is keto or 17β-hydroxy.

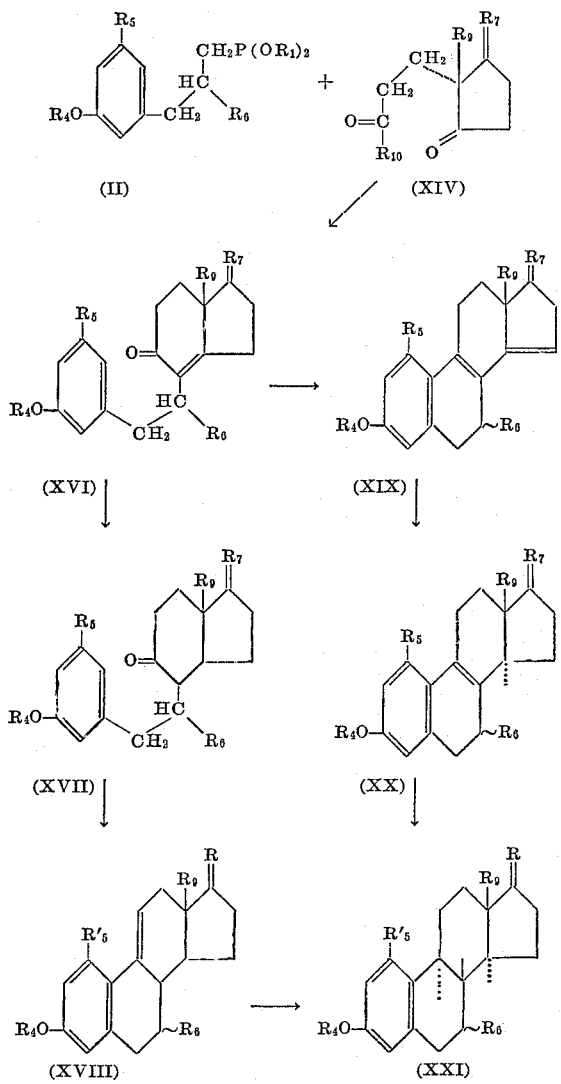

In the procedures shown by the above schematic diagram, the carbanion generated from the phosphonate of Formula II is reacted with the keto carboxylic acid compound of Formula XIV as described above. For example, the carbanion can be generated in a mixture of tetrahydrofuran and hexane to which the keto carboxylic acid compound is added in dry tetrahydrofuran while maintaining the temperature at about −78° C. The reaction mixture is allowed to warm to room temperature and to stand at room temperature for 3 hours. The reaction mixture is diluted with water and extracted with ether to yield 4-phenylethylene-5,6,7,7a-tetrahydroindan-5-ones (9,10-secoestra-1,3,5(10),8(14)-tetraen-9-ones) of Formula XVI. Hydrogenation of this α,β-unsaturated ketone using, for example, a 5 percent palladium-on-carbon catalyst in an inert organic solvent such as benzene yields the corresponding 4-phenylethyleneperhydroindan-5-ones (9,10-secoestra-1,3,5(10)-trien-9-ones) of Formula XVII. The latter compounds can be cyclodehydrated at the reflux temperature of a solvent such as benzene in the presence of a dehydrating acid such as p-toluenesulfonic acid according to conventional procedures to yield the estra-1,3,5(10),9(11)-tetraenes of Formula XVIII. Reduction of the latter compounds, for example, using 5 percent palladium-on-carbon catalyst in benzene yields the estra-1,3,5(10)-trienes of Formula XXI. Alternatively, the α,β-unsaturated ketones of Formula XVI can first be cyclodehydrated using p-toluenesulfonic acid in benzene as described above or preferably with polyphosphoric acid at 80° C. to yield the estra-1,3,5(10),8,14-pentaenes of Formula XIX. The latter compounds when hydrogenated in the presence of a metal catalyst such as a 10 percent palladium-on-carbon catalyst in benzene yields the estra-1,3,5(10),8-tetraene of Formula XX. Selective reduction of the tetraene with sodium and ammonia in an etherdioxane solution yields the estra-1,3,5(10)-triene of Formula XXI. Removal of the protecting group at the 3 and 17 positions ($R_4$ and $R_7$) by conventional acid hydrolysis yields the corresponding 3β-hydroxyestra-1,3,5(10)-trien-17-ones or the estra-1,3,5(10)-triene-3β-diols, depending upon what protected group was present at the 17 position. The compounds of Formula XXI are known in the art and are useful for their estrogenic activity.

Phosphonates useful in the process of this invention can be prepared as follows:

PREPARATION A

Diethyl 4,4-dimethoxybutylphosphonate and diethyl 3-carboxypropylphosphonate

To 0.5 moles of diethylmalonate in 0.5 liter of dry benzene is added 0.5 mole of sodium hydride cautiously and the mixture stirred until hydrogen evolution ceases. Then 0.5 mole of bromoacetaldehydedimethylacetal

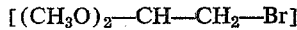

in 100 ml. of benzene is added and the mixture stirred overnight followed by refluxing for two hours. The reaction mixture is cooled, washed with water and purified by vacuum distillation to give β,β-dimethoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaporated to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give γ-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then diluted with water. This mixture is extracted with ether and the ether extracts are combined, washed, dried and evaporated to dryness to afford 4,4-dimethoxybutanol

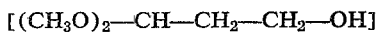

A solution of 0.1 mole of 4,4-dimethoxybutanol in 50 ml. of dimethylformamide containing 0.1 mole of triphenylphosphine is allowed to react for 18 hours with 0.1 mole of carbon tetrabromide. The mixture is diluted with water and extracted with ether. The ether extracts are combined, washed with water, dried and evaporated to a crude product which is purified by distillation to yield 4,4-dimethoxybutylbromide. This bromide on treatment with diethylphosphite in tetrahydrofuran furnished diethyl 4,4-dimethoxybutylphosphonate.

A mixture of 1 g. of 4,4-dimethoxybutylbromide, 25 ml. of dioxane and 1 ml. of 5 percent aqueous HCl is heated at reflux for 15 minutes. The mixture is allowed to cool and then is poured into water and separated. The organic phase is evaporated to dryness to furnish the corresponding 3-formylpropylbromide. To a stirred solution of 1 g. of the aldehyde in 10 ml. of acetone, cooled to 0° C. is added under nitrogen a solution of 8 N chromic acid prepared by mixing 26 g. of chromium trioxide with 23 ml. of concentrated sulfuric acid and diluting with water, until the color of the reagent persists in the mixture. The mixture is then stirred for 5 minutes at 0–5° C. and diluted with water. The solid which forms is collected by filtration, washed with water and dried under vacuum to yield 3-carboxypropylbromide. The bromide on treatment with diethyl phosphite in tetrahydrofuran yields diethyl 3-carboxypropylphosphonate.

Also, by using other di-substituted phosphites, e.g. dimethyl phosphite, dibenzyl phosphite or diphenyl phosphite in place of diethyl phosphite in the above procedures, dimethyl, dibenzyl or diphenyl 4,4-dimethoxybutylphosphonate and 3 - carboxypropylphosphonate are obtained.

PREPARATION B

Diethyl 4,4-ethylenedioxyhexylphosphonate

A solution of 20.9 g. of the ethylene ketal of ethyl 3-bromopropyl ketone (obtained by treating the ketone with ethylene glycol in benzene in the presence of p-toluenesulfonic acid) is treated with diethylphosphite in tetrahydrofuran to yield diethyl 4,4-ethylenedioxyhexylphosphonate,

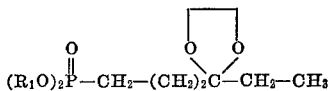

wherein $R_1$ is ethyl. Repeating the procedure with dimethyl phosphite, dibenzyl phosphite or diphenyl phosphite yields the corresponding dimethyl, dibenzyl or diphenyl 4,4-ethylenedioxyhexylphosphonate.

The 1-halo-4-alkanone compounds can be prepared, for example, by procedures described in German Pat. No. 801,276 (December 1950) or Jager et al., Arch. Pharm. 293, 896 (1960).

PREPARATION C

Diethyl 3-(2-methoxy-6-methyltetrahydropyran-2-yl) propylphosphonate

A suspension of 0.5 g. of 1-chloropentan-4-ol in 40 ml. of methylene chloride is cooled to —70° and then 40 ml. of isobutylene and 0.6 ml. of 93% sulfuric acid are added. The mixture is shaken for 17 hours in a pressure vessel. The vessel is then recooled to —70°, opened and the solution poured into aqueous sodium bicarbonate with stirring. Isolation with methylene chloride yields the t-butyl ether of 1-chloropentan-4-ol.

A mixture of 0.5 mole of 1,3-dithiane and 300 ml. of tetrahydrofuran cooled to —30° is treated with 0.5 molar equivalents of 1.5 molar n-butyl lithium in hexane under nitrogen and stirred for 15 hours at —20°. Then 0.5 mole of the tetrahydropyranyl ether of 3-bromopropanol in 200 ml. of tetrahydrofuran is added slowly with stirring at —5° and then left for 14 hours at 0° under nitrogen. The resulting mixture is cooled to —30° and treated with an additional 0.5 molar equivalents of 1.5 molar n-butyl lithium in hexane. After 1.5 hours, 0.5 mole of the t-butyl ether of 1-chloropentan-4-one in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated. The resulting dialkylated thiane 2-[8-(t-butoxy)-4,4-trimethylenedithionoyloxy]-tetrahydropyran,

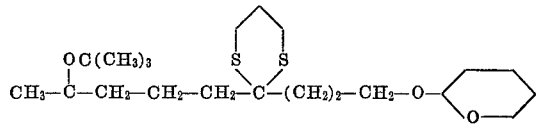

is dissolved in methanol and stirred for 0.5 hour with 20 ml. of 1% oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to —70° and then treated with one equivalent to tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The tosylate is dissolved in dry ethylene glycol containing 0.5 g. of mercuric chloride. The mixture is allowed to stand overnight and then heated to 60° for five hours. After cooling, water is added and the tosylate of the ketal 8-(t-butoxy)-4,4 - ethylenedioxy- nonanol,

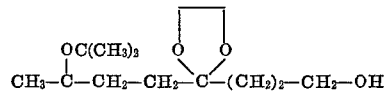

isolated by extraction with ether. This is cyclized by treatment in methanol containing hydrogen chloride at 25° for about 12 hours to give the tosylate of 3-(2-methoxy-6-methyltetrahydropyran-2-yl)propanol,

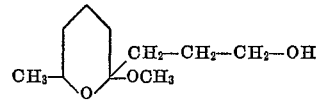

This is converted into the corresponding bromide by treatment with lithium bromide in isopropanol as described above. The bromide is treated with diethyl phosphite in tetrahydrofuran to yield diethyl 3-(2-methoxy-6-methyltetrahydropyran-2-yl)propylphosphonate.

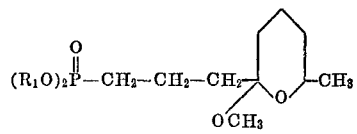

wherein $R_1$ is ethyl.

Repeating the above procedure with dimethyl, dibenzyl, or diphenyl phosphite yields the corresponding dimethyl, dibenzyl or diphenyl 3-(2-methoxy - 6 - methyltetrahydropyran-2-yl)propylphosphonate.

PREPARATION D

Diethyl 8-chloro-4,4-ethylenedioxy-7-nonenylphosphonate

A mixture of 0.5 mole of 1,3-dithiane and 300 ml. of tetrahydrofuran cooled to —30° is treated with 0.5 molar equivalents of 1.5 molar n-butyl lithium in hexane under nitrogen and stirred for 15 hours at —20°. Then 0.5 mole of tetrahydropyranyl ether of 3-bromopropanol in 200 ml. of tetrahydrofuran is added slowly with stirring at —5° and then left for 14 hours at 0° under nitrogen. The resulting mixture is cooled to —30° and treated with an additional 0.5 molar equivalents of 1.5 molar n-butyl lithium in hexane. After 1.5 hours, 0.5 mole of 4-chloro-1-bromopent-3-ene in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated. The resulting dialkylated thiane 2-(8-chloro-4-trimethylenedithio - 7 - nonenyloxy)-tetrahydropyran

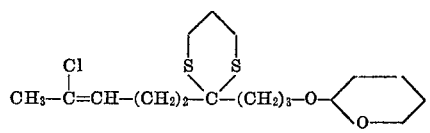

is dissolved in methanol and stirred for two hours with 20 ml. of 1% oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to —70° and then treated with one equivalent of tosyl chloride in methylene chloride. The mitxure is left standing at 0° for 18 hours and then allowed to warm to room temperature. The mixture is then diluted with water and the resulting tosylate isolated by extraction with methylene chloride and purified by chromatography. The thus-obtained tosylate is dissolved in dry ethylene glycol containing 0.5 g. of mercuric chloride. This reaction mixture is allowed to stand overnight and then heated to 60° for five hours. After cooling, water is added and the corresponding ketal isolated by extraction with ether. The ketal (0.5 g.) in 25 ml. of dry isopropanol and 0.5 g. of lithium bromide is refluxed for 12 hours. After cooling, the reaction mixture is diluted with water and extracted with ether. The resulting 8-chloro-4,4-ethylenedioxy-7-noneyl bromide

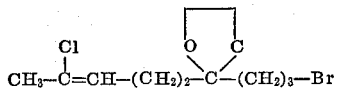

is treated with diethyl phosphite in tetrahydrofuran to yield diethyl 8-chloro-4,4-ethylenedioxy-7-nonenylphosphonate.

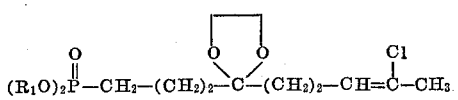

wherein $R_1$ is ethyl.

Repeating this procedure with dimethyl, dibenzyl or diphenyl phosphite yields the corresponding dimethyl, dibenzyl or diphenyl 8-chloro-4,4-ethylenedioxy-7-nonenylphosphonate.

PREPARATION E

Diethyl 8,8-ethylenedioxy-4,4-trimethylenedithiononylphosphonate and diethyl 4,4;8,8-di(ethylenedioxy)nonylphosphonate A mixture of 0.5 moles of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 mole of the ethylene ketal of methyl-3-bromopropyl ketone in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 15 hours, 0.5 mole of 1-bromo-3-chloropropane in 200 ml. of tetrahydrofuran is added. The resulting mixture is left standing for 18 hours at 0° C. and then allowed to warm to room temperature and stand for four hours. Water is added and the resulting mixture extracted with ether. The ether extracts are combined, washed with water, dried and evaporated to yield 4,4-ethylenedioxy-8,8-trimethylenedithiononyl bromide

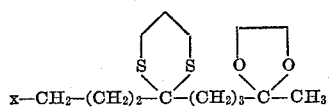

wherein R is phenyl and $x$ is chloro. This 1-chloro compound is dissolved in dry ethylene glycol containing 0.5 g. of mercuric chloride. The mixture is allowed to stand overnight and then heated to 60° for five hours. After cooling, water is added and the corresponding diketal 4,4;8,8-di(ethylenedioxy)nonyl chloride

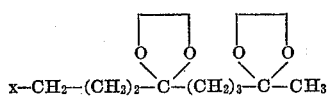

wherein R is phenyl and $x$ is chloro is isolated by extraction with ether. The diketal is treated with diethyl phosphite in tetrahydrofuran to yield diethyl 4,4;8,8-di(ethylenedioxy)nonyl phosphonate.

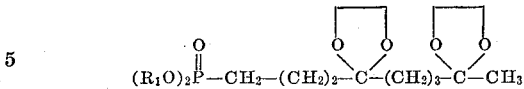

wherein $R_1$ is ethyl.

The trimethylenedithio compound can be similarly treated with diethyl phosphite to yield diehtyl 4,4-ethylenedioxy-8,8-trimethylenedithiononylphosphonate.

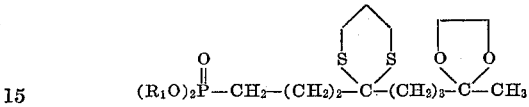

wherein R is ethyl.

Repeating these procedures with dimethyl, dibenzyl or diphenyl phosphite yields the corresponding dimethyl, dibenzyl or diphenyl 8,8-ethylenedioxy-4,4-trimethylenedithiononylphosphonate and 4,4;8,8 - di(ethylenedioxy) nonylphosphonate.

This invention is further illustrated by the following specific but non-limiting examples.

EXAMPLE 1

1-(lower)alkyl-5-oxo-cyclopent-1-ylpropionates

A mixture of 0.3 g. of 2-methylcyclopentane-1,3-dione, 0.33 ml. of methyl acrylate and a catalytic amount of sodium methoxide in 10 ml. of dimethylformamide is refluxed for 2 hours. The reaction mixture is evaporated to a small volume, diluted with aqueous sodium hydroxide, and extracted with ether. The extract is washed until neutral with water, dried and evaporated to yield methyl 1-methyl-2,5-dioxocyclopent-1-ylpropionate which is purified by distillation. A mixture of 1 g. of the latter compound, 25 ml. of dry benzene, 1 molar equivalent of ethylene glycol and 50 mg. of p-toluene sulfonic acid monohydrate is refluxed for 16 hours using a water separator. The reaction mixture is then washed with water, dried and evaporated to dryness to yield methyl 2,2-ethylenedioxy-1-methyl-5-oxo-cyclopent-1-ylpropionate which is purified by chromatography on silica gel, eluting with benzene-ether.

Repeating the above procedure with ethyl acrylate, propyl acrylate, n-butyl acrylate, n-pentyl acrylate, n-hexyl acrylate, benzyl acrylate, phenyl acrylate, tolyl acrylate, p-propylphenyl acrylate yields the corresponding, respective ethyl, propyl, n-butyl, n-pentyl, n-hexyl, benzyl, phenyl, tolyl and p-propylphenyl 2,2-ethylenedioxy-1-methyl-5-oxocyclopent-1-ylpropionates.

Repeating the above procedures with methyl acrylate and the other enumerated acrylates but replacing 2-methylcyclopentane-1,3-dione with 2 - ethylcyclopentan-1,3 - dione, 2 - propylcyclopentan-1,3-dione, 2-(n-butyl) cyclopentan-1,3-dione, 2-(n-pentyl)cyclopentan-1,3-dione, and 2-(n-hexyl)cyclopentan-1,3-dione yields the corresponding methyl, ethyl, propyl, n-butyl, n-pentyl, n-hexyl, benzyl, phenyl, tolyl and p-propylphenyl esters of 2,2-ethylenedioxy-1-ethoxy-5-oxocyclopent-1-ylpropionic acid,
2,2-ethylenedioxy-5-oxo-1-propylcyclopent-1ylpropionic acid,
1-(n-butyl)-2,2-ethylenedioxy-5-oxocyclopent-1-ylpropionic acid,
2,2-ethylenedioxy-5-oxo-1-(n-pentyl)cyclopent-1-ylpropionic acid, and
2,2-ethylenedioxy-1-(n-hexyl)5-oxocyclopent-1-ylpropionic acid, respectively.

The 1-alkyl-5-oxocyclopent-1-ylpropionates can also be prepared according to the procedure described in French Pat. 1,496,817.

EXAMPLE 2

2,2-ethylenedioxy-1-(lower)alkyl-5-oxocyclopent-1-ylpropionic acid

One gram of methyl 2,2-ethylenedioxy-1-methyl-5-oxocyclopent-1-ylpropionate is hydrolyzed in a methanolic KOH solution at room temperature for 24 hours, and the reaction mixture is then carefully acidified with 0.1 N hydrochloric acid to a pH of 2–3. The solvent is then evaporated, the residue extracted with ether, and the ether solution washed with aqueous sodium bicarbonate, aqueous sodium chloride solution, and then dried to yield 2,2 - ethylenedioxy-1-methyl-5-oxocyclopent-1-ylpropionic acid.

Repeating the above procedure with the other esters produced in Example 1 yields the corresponding 2,2-ethylenedioxy-1-ethyl-5-oxocyclopent-1-ylpropionic acid,
2,2-ethylenedioxy-5-oxo-1-propylcyclopent-1-ylpropionic acid,
1(n-butyl)-2,2-ethylenedioxy-5-oxocyclopent-1-ylpropionic acid,
2,2-ethylenedioxy-5-oxo-1,(n-pentyl)cyclopent-1-ylpropionic acid, and
2,2-ethylenedioxy-1-(n-hexyl)-5-oxocyclopent-1-ylpropionic acid, respectively.

EXAMPLE 3

2,2-ethylenedioxy-1-(lower)alkyl-5-oxocyclopent-1-ylpropionyl chloride

One molar equivalent of 2,2-ethylenedioxy-1-methyl-5-oxocyclopent-1-ylpropionic acid is added to a solution of 1 molar equivalent of triphenylphosphine and one molar equivalent of carbon tetrachloride, and the mixture is maintained at room temperature for one hour. The reaction product is evaporated to dryness to yield 2,2-ethylenedioxy - 1 - methyl-5-oxocyclopent-1-ylpropionyl chloride. This is immediately dissolved in tetrahydrofuran and used since it is relatively unstable.

Repeating the above procedure with the products of Example 2 yields the corresponding 2,2-ethylenedioxy-1-ethyl-5-oxocyclopent-1-ylpropionyl chloride
2,2-ethylenedioxy-5-oxo-1-propylcyclopent-1ylpropionyl chloride
1(n-butyl)-2,2-ethylenedioxy-5-oxocyclopent-1-ylpropionyl chloride,
2,2-ethylenedioxy-5-oxo-1-(n-pentyl)cyclopent-1-ylpropionyl chloride, and
2,2-ethylenedioxy-1-(n-hexyl)5-oxocyclopent-1-ylpropionyl chloride, respectively.

EXAMPLE 4

2,2-ethylenedioxy-1-(lower)alkyl-5-oxocyclopent-1-ylpropionyl bromide

Repeating the procedure of Example 3 but replacing carbon tetrachloride with a solution of 10 g. of carbon tetrabromide in 50 ml. of hexane yields the corresponding 2,2-ethylenedioxy-1-ethyl-5-oxocyclopent-1-ylpropionyl bromide
2,2-ethylenedioxy-5-oxo-1-propylcyclopent-1-ylpropionyl bromide
1-(n-butyl)-2,2-ethylenedioxy-5-oxocyclopent-1-ylpropionyl bromide,
2,2-ethylenedioxy-5-oxo-1-(n-pentyl)cyclopent-1-ylpropionyl bromide, and
2,2-ethylenedioxy-1-(n-hexyl)-5-oxocyclopent-1-ylpropionyl bromide, respectively.

EXAMPLE 5

2,2 - ethylenedioxy - 5 - oxocyclopent-1-ylpropionic acid and 2,2 - ethylenedioxy-1-(lower)alkyl-5-oxocyclopent-1 - ylpropionic acid anhydrides of lower aliphatic carboxylic acids A methanol solution of 1 g. mole of 2,2-ethylenedioxy-1-methyl-5-oxocyclopent-1-ylpropionic acid is titrated to neutrality with methanolic potassium hydroxide and evaporated to yield the corresponding potassium salt. To a suspension of this salt in benzene is added 1 g. mole of acetic anhydride, and the mixture is maintained at room temperature for one hour. The solvent is then filtered and evaporated to yield 2,2 - ethylenedioxy-1-methyl-5-oxocyclopent-1-ylpropionic acetic acid anhydride. This is immediately dispersed in tetrahydrofuran and used since it is relatively unstable.

Repeating the above procedure with the other acids produced in Example 2 yields the corresponding.

2,2-ethylenedioxy-1-ethyl-5-oxocyclopent-1-ylpropionic acid acetic acid anhydride,
2,2-ethylenedioxy-5-oxo-1-propylcyclopent-1-ylpropionic acid acetic acid anhydride,
1-(n-butyl)-2,2-ethylenedioxy-5-oxocyclopent-1-yl-propionic acid acetic acid anhydride,
2,2-ethylenedioxy-5-oxo-(n-pentyl)cyclopent-1-ylpropionic acid acetic acid anhydride, and
2,2-ethylenedioxy-1-(n-hexyl)-5-oxocyclopent-1-ylpropionic acid acetic acid anhydride, respectively.

Repeating the above procedure with acyl chlorides of other lower aliphatic carboxylic acids such as propionyl chloride, butyryl chloride, valeryl chloride and the like yields the corresponding 2,2-ethylenedioxy-1-(lower)alkyl-5-oxocyclopent-1-ylpropionic acid anhydrides of the respective lower aliphatic carboxylic acids.

EXAMPLE 6

S-(lower)alkyl 2,2-ethylenedioxy-1-(lower)alkyl-5-oxocyclopent-1-ylpropanethioates One gram mole of 2,2-ethylenedioxy-1-methyl-5-oxocyclopent-1-ylpropionyl chloride in 25 ml. of a 1:1 puridine-benzene solution is mixed with 1 g. mole of methylmercaptan in 25 ml. of a 1:1 pyridine-benzene solution, the reaction mixture is maintained at room temperature for 1 hour. The solvent is evaporated, and the residue is extracted with ether. The ether phase is washed with aqueous sodium bicarbonate, then aqueous sodium chloride, and then dried to yield S-methyl 2,2-ethylenedioxy-1-methyl-5-oxocyclopent-1-ylpropanethioate.

Repeating the above procedure with other lower alkyl mercaptans such as ethyl mercaptan, propyl mercaptan, n-butyl mercaptan, n-pentyl mercaptan, and n-hexyl mercaptan yields the corresponding S-ethyl, S-propyl, S-(n-butyl), S-(n-pentyl) and S-(n-hexyl) 2,2-ethylenedioxy-1-methyl-5-oxocyclopent-1-ylpropanethioates.

Repeating the above procedures with the other propionyl chlorides produced in Example 3 yields the corresponding S-methyl, S-propyl, S-(n-butyl), S-ethyl, S-(n-pentyl) and S-(n-hexyl) thioates of the respective 2,2-ethylenedioxy-1-(lower)alkyl - 5 - oxocyclopent-1-ylpropanes.

EXAMPLE 7

To a suspension of 2 g. of dimethyl methylphosphonate in 50 ml. of dry tetrahydrofuran at −78° under nitrogen, there is added one equivalent of n-butyl lithium in hexane with stirring. After about five minutes, there is added 0.5 equivalent of methyl 2,2-ethylenedioxy-1-methyl-5-oxocyclopentylpropionate in 50 ml. of dry tetrahydrofuran while maintaining the temperature at about −78°. The reaction mixture is allowed to warm to room temperature and to stand at room temperature for three hours. The reaction mixture is diluted with water and then extracted with ether. The ether extracts are combined, washed, dried and evaporated under reduced pressure to give 1,1-ethylenedioxy - 7a - methyl-5,6,7,7a-tetrahydroindan-5-one which can be further purified by chromatography or fractional distillation.

The α,β-unsaturated bicarbocyclic ketone is a useful intermediate for the synthesis of steroids using the method of, for example, Whitehurst et al., U.S. Pat. 3,317,566.

EXAMPLE 8

To a suspension of 2 g. of diethyl methylphosphonate in 50 ml. of diglyme at —78° C. under nitrogen, there is added 2.4 equivalents of n-butyl lithium in hexane with stirring. After 5 minutes, there is added 0.5 equivalents of methyl 2,2-ethylenedioxy-1-methyl-5-oxocyclopent-1-ylpropionate in 50 ml. of diglyme while maintaining the temperature at about —78° C. The temperature is allowed to rise to —20° C. and the mixture to then stand for 2 hours. There is then added 35 ml. of hexamethyl phosphoramide, and the mixture is refluxed for 12 hours under nitrogen. The reaction mixture is cooled, diluted with water and extracted with ether to yield 1,1-ethylenedioxy-7a-methyl-5,6,7,7a-tetrahydroindan-5-one which is purified by chromatography on silica gel, eluting with benzene-ether.

EXAMPLE 9

Repeating the procedure of Example 7 but replacing methyl 2,2 - ethylenedioxy-1-methyl-5-oxocyclopent-1-ylpropionate with ethyl 2,2-ethylenedioxy-1-methyl-5-oxocyclopent-1-ylpropionate,
phenyl 2,2-ethylenedioxy-1-methyl-5-oxocyclopent-1-ylpropionate,
tolyl 2,2-ethylenedioxy-1-methyl-5-oxocyclopent-1-ylpropionate,
benzyl 2,2-ethylenedioxy-1-methyl-5-oxocyclopent-1-ylpropionate,
S-methyl 2,2-ethylenedioxy-1-methyl-5-oxocyclopent-1-ylpropanethioate,
S-propyl 2,2-ethylenedioxy-1-methyl-5-oxocyclopent-1-ylpropanethioate,
2,2-ethylenedioxy-1-methyl-5-oxocyclopent-1-ylpropionyl bromide, and
2,2-ethylenedioxy-1-methyl-5-oxocyclopent-1-ylpropionyl chloride, yields 1,1-ethylenedioxy-7a-methyl-5,6,7,7a-tetrahydroindan-5-one.

Repeating this procedure with other propionates, propanethioates and propionyl halides, e.g., methyl 1-(n-butyl)-2,2-ethylenedioxy-5-oxocyclopent-1-ylpropionate,
phenyl 2,2-ethylenedioxy-1-ethyl-5-oxocyclopent-1-ylpropionate, and
S-propyl 2,2-ethylenedioxy-5-oxo-1-propylcyclopent-1-ylpropanethioate yields the corresponding 5,6,7,7a-tetrahydroindan-5-ones, that is, 7a-(n-butyl)-1,1-ethylenedioxy-5,6,7,7a-tetrahydroindan-5-one,
1,1-ethylenedioxy-7a-ethyl-5,6,7,7a-tetrahydroindan-5-one, and
1,1-ethylenedioxy-7a-propyl-5,6,7,7a-tetrahydroindan-5-one.

EXAMPLE 10

Repeating the procedure of Example 7 but replacing dimethyl methylphosphonate with other disubstituted methylphosphonates such as, for example, dimethyl ethylphosphonate, dimethyl 3-cycloethylenedioxypentylphosphonate, dimethyl 3,3-dimethoxybutylphosphonate, dimethyl propylphosphonate, dimethyl n-butylphosphonate, and the like yields the corresponding 1,1-ethylenedioxy-7a-methyl-5,6,7,7a-tetrahydroindan - 5 - one compounds having at the 4 position the respective methyl 3-cyclo- ethylenedioxybutyl, 3,3-dimethoxypropyl, ethyl, and n-propyl group.

EXAMPLE 11

Repeating the procedure of Example 7 with diethyl 3-(3,5 - dimethoxyphen-1-yl)propylphosphonate yields 1,1-ethylenedioxy - 7a-methyl-4-(3,5-dimethoxy-1-phenylethylene)-5,6,7,7a-tetrahydroindan-5-one.

Repeating this procedure with other dialkyl, dibenzyl and diphenyl 3-(phen-1-yl)propylphosphonates and cyclopentylpropionic acid compounds of Formulas II and XIV above yields the corresponding compounds of Formula XVI, e.g.

1,1-ethylenedioxy-7a-methyl-4-(3-methoxyphen-1-ylethyl)-5,6,7,7a-tetrahydroindan-5-one,
1,1-ethylenedioxy-7a-ethyl-4-(3,5-dimethoxyphen-1-ylethyl)-5,6,7,7a-tetrahydroindan-5-one,
1,1-ethylenedioxy-7a-ethyl-4-(3-methoxyphen-1-ylethyl)-5,6,7,7a-tetrahydroindan-5-one,
1,1-ethylenedioxy-7a-propyl-4-(3,5-dimethoxyphen-1-ylethyl)-5,6,7,7a-tetrahydroindan-5-one,
1,1-ethylenedioxy-7a-propyl-4-(3-methoxyphen-1-ylethyl)-5,6,7,7a-tetrahydroindan-5-one,
1,1-ethylenedioxy-7a-ethyl-4-[3-(3,5-dimethoxyphen-1-yl)-propyl]-5,6,7,7a-tetrahydroindan-5-one,
1,1-ethylenedioxy-7a-methyl-4-[3-(3,5-dimethoxyphen-1-yl)-propyl]-5,6,7,7a-tetrahydroindan-5-one, and the like.

EXAMPLE 12

To a suspension of 7 g. of dimethyl methylphosphonate in 50 ml. of tetrahydrofuran is added with stirring under nitrogen at —78° C., 11.4 ml. of a 1.6 M solution of butyl lithium in hexane.

After 5 minutes, there is added 0.5 equivalents of methyl 2,2 - ethylenedioxy-1-methyl-5-oxocyclopent-1-ylpropionate in 50 ml. of tetrahydrofuran while maintaining the temperature at —78° C. The temperature is allowed to rise to —20° C. and the mixture to stand for 2 hours. A solution of 1 g. sodium methoxide in 50 ml. of dry ethanol is added thereto.

The mixture is refluxed for 7 hours under a nitrogen atmosphere, the solvent is removed in vacuo, and the product is extracted with ether and purified by chromatography on silica gel to yield 1,1-ethylenedioxy-7a-methyl-5,6,7,7a-tetrahydroindan-5-one.

EXAMPLE 13

4-(2-carboxyethyl)-7a-methyl-5,6,7,7a-tetrahydroindan-1,5-dione

Repeating the procedure of Example 7 wth diethyl 4,4-dimethoxybutylphosphonate yields 1,1-ethylenedioxy-4-(3,3 - dimethoxypropyl)-7a-methyl-5,6,7,7a-tetrahydroindan-5-one. A mixture of 1 g. of the latter ketone, 25 ml. of methanol and 1 ml. of concentrated HCl is boiled for 15 minutes. The reaction mixture is allowed to cool, poured into water, and the resulting mixture separated. The organic phase is evaporated to dryness to furnish 4-(2-formylethyl)-7a-methyl - 5,6,7,7a - tetrahydroindan-1,5-dione which is taken up in 20 ml. of acetone, cooled to 0° C., and a slight molar excess of Jones reagent (prepared by mixing 26 g. of chromium trioxide with 23 ml. of concentrated sulfuric acid and diluting with water to 100 ml.) is added. Upon completion of the oxidation as followed by thin layer chromatography, the reaction mixture is diluted with water and then combined with ethyl acetate. The ethyl acetate extracts are combined, washed with water, dried and evaporated under reduced pressure to yield 4-(2-carboxyethyl) - 7a - methyl-5,6,7,7a-tetrahydroindan-1,5-dione. This product is a valuable intermediate for the synthesis of known 19-nor-$\Delta^4$ and $\Delta^{5(10)}$ steroids useful as therapeutic agents using the procedure of, for example, Belgium Pat. 629,251 (1963); French Pat. 1,465,400 (1965); Netherlands Pat. 6,414,702; of Velluz et al., Tetrahedron, Suppl. 8 Part II, pp. 495–505 (1966).

Repeating the procedure with the other corresponding 2,2-ethylenedioxy - 1 - (lower)alkyl-5-oxocyclopent-1-ylpropionates produced in Example 1 yields the corresponding 7a-(lower)alkyl compounds.

As an alternate procedure, the procedure of Example 7 is followed using diethyl 3-carboxypropylphosphonate and sufficient n-butyl lithium in hexane is added with stirring to provide 2.4 molar equivalents of n-butyl lithium after neutralization of the acid. After about 5 minutes, 1.1 molar equivalents of the methyl 2,2-ethylenedioxy-1-methyl-5-oxocyclopent-1-ylpropionate is added in 50 ml. of dry tetrahydrofuran while maintaining the temperature at about —78° C. The reaction mixture is allowed to warm to room temperature and to stand at room temperature for 3 hours. The reaction mixture is then diluted with water, acidified with hydrochloric acid, and extracted with ethyl acetate. The ethyl acetate extract is washed with water, dried and evaporated under reduced pressure. The residue is chromatographed on silica to yield 4-(2-carboxyethyl) - 7a - methyl - 5,6,7,7a-tetrahydroindan-1,5-dione.

Repeating this alternate procedure with the other corresponding 2,2 - ethylenedioxy-1-(lower)alkyl-5-oxocyclopent-1-ylpropionates produced in Example 1 yields the corresponding 7a-(lower)alkyl compounds.

EXAMPLE 14

2,5-dimethyl-1,2-(3'-oxocyclopentano)-1,2,3,4,6,7,8,8a-octahydronaphthylene-6-one Repeating the procedure of Example 7 but replacing dimethyl methylphosphonate with diethyl 4,4-ethylenedioxyhexylphosphonate yields the corresponding 1,1-ethylenedioxy - 4 - (3,3-ethylenedioxypentyl)-7a-methyl-5,6,7,7a-tetrahydroindan-5-one. 2 grams of this compound in 25 ml. of 0.2 percent triethylamine and 100 ml. of 95 percent aqueous ethanol is hydrogenated at room temperature and room pressure over 5 percent palladium-on-charcoal until 1 equivalent of hydrogen is absorbed. The mixture is filtered, and 1 g. of the filtrate in 100 ml. of 80 percent acetic acid is refluxed under nitrogen for 7 hours. The mixture is concentrated under vacuum and poured into water. The solid formed is separated by filtration, washed with water and dried. The solid is cyclized with 1 percent methanolic sodium hydroxide to yield 2,5-dimethyl-1,2-(3' - oxocyclopentano) - 1,2,3,4,6,7,8,8a - octahydronaphthylene - 6 - one which can be represented as follows:

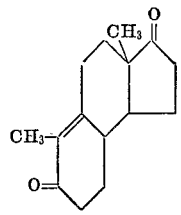

This compound is an intermediate for androst-4-enes or retrosteroids using the procedure of, for example, Netherlands Patent 67,07919 (1967).

Repeating the above procedure with the other 2,2-ethylenedioxy - 1 - (lower)alkyl - 5 - oxocyclopent-1-ylpropionates produced in Example 1 yields the corresponding 7a-(lower)alkyl compounds.

EXAMPLE 15

2-methyl-5-(3-oxobutyl)-1,2-(3'-oxocyclopentano)perhydronaphthylen-6-one

Repeating the procedure of Example 7 but replacing dimethyl methylphosphonate with diethyl 3-(2-methoxy-6 - methyltetrahydropyran-2-yl)propylphosphonate yields the corresponding 1,1 - ethylenedioxy - 4 - (2-methoxy-6-methyltetrahydropyran - 2 - ylethyl)-7a-methyl-5,6,7,7a-tetrahydroindan-5-one. This compound is hydrolyzed with sulfuric acid in aqueous dioxane. 2 grams of the product in 25 ml. of 0.2 percent triethylamine and 100 ml. of 95 percent aqueous ethanol is hydrogenated at room temperature and room pressure over 5 percent palladium-on-charcoal until 1 equivalent of hydrogen is absorbed. The mixture is filtered, and the filtrate evaporated to yield a solid residue.

A mixture of 1 g. of the residue, 100 ml. of methanol, 10 ml. of ether, and 20 ml. of 37 percent hydrochloric acid is heated at reflux for 2 hours under nitrogen. The solvent is removed under reduced pressure, and isolation with ether yields the unsaturated tricarbocyclic diketone 5-(3-hydroxybutyl)-2-methyl-1,2 - (3' - oxocyclopentano)-1,2,3,4,6,7,8,8a - octahydronaphthylen-6-one. This is hydrogenated using the procedure described above to yield the corresponding saturated tricarbocyclic diketone which is oxidized using chromium trioxide in pyridine or Jones reagent as described in Example 13 to yield the saturated triketone 2-methyl-5-(3-oxobutyl) - 1,2 - (3' - oxocyclopentano)perhydronaphthylen-6-one.

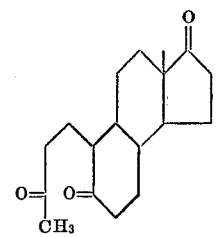

This compound is a useful intermediate for the preparation of steroids accordng to procedures described in French Pat. 1,465,400 and U.S. Pat. 3,413,314 (1968).

Repeating this procedure with the other corresponding 2,2-ethylenedioxy - 1 - (lower)alkyl - 5 - oxocyclopent-1-ylpropionate produced in Example 1 yields the corresponding 7a-(lower)alkyl compounds.

EXAMPLE 16

5-(3-chloro-2-buten-1-yl)-2-methyl-1,2-(3'-oxocyclopentano)-1,2,3,4,6,7,8,8a-octahydronaphthylen-6-one Repeating the procedure of Example 7 but replacing dimethyl methylphosphonate with diethyl 8 - chloro - 4,4-ethylenedioxy-7-nonen-1 - ylphosphonate yields the corresponding 4 - (7 - chloro-3,3-ethylenedioxy-6-octen-1-yl)-1,1-ethylenedioxy-7a-methyl 5,6,7,7a - tetrahydroindan-5-one. This compound is then hydrolyzed, hydrogenated, and then cyclized with aqueous hydrochloric acid by the procedure described in Example 15 to yield 5-(3-chloro-2-buten-1-yl) - 2 - methyl - 1,2 - (3' - oxocyclopentano)-1,2,3,4,6,7,8,8a - octahydronaphthylen-6-one which can be represented as follows

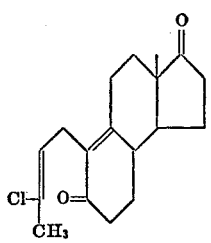

The above tricarbocyclic ketone is a useful intermediate for the synthesisi of aromatic steroids using the procedure of U.S. Pats. 3,050,550 and 3,150,152.

Repeating this procedure with the other corresponding 2,2 - ethylenedioxy - 1 - (lower)alkyl-5-oxocyclopent-1-ylpropionates produce in Example 1 yields the corresponding 7a-(lower)alkyl compounds.

EXAMPLE 17

2-methyl-5-(3-oxobutyl)-1,2-(3'-oxocyclopentano)perhydronaphthylen-6-one

Repeating the procedure of Example 7 but replacing dimethyl methylphosphonate with diethyl 4,4;8,8-di-(ethylenedioxy)nonyl-phosphonate yields the corresponding 1,1 - ethylenedioxy - 4 - [3,3:7,7-di(ethylenedioxy)octyl]-7a-methyl-5,6,7,7a-tetrahydroindan - 5 - one. This compound is hydrolzed, hydrogenated, cyclized with aqueous hydrochloric acid, and then hydrogenated by the procedure described in Example 15 to yield 2-methyl-5-(3-oxobutyl) - 1,2 - (3'-oxocyclopentano)perhydronaphthylen-6-one.

Repeating the procedure of Example 7 but replacing dimethyl methylphosphonate with diethyl 8,8-ethylenedioxy-4,4-trimethylene-dithionon-1 - ylphosphonate yields the corresponding 1,1-ethylenedioxy - 4 - (7,7-ethylenedioxy - 3,3 - trimethylenedithiooct - 1 - yl)-7a-methyl-5,6,7,7a-tetrahydroindan-5-one. This compound is then hydrolyzed, hydrogenated, cyclized with aqueous hydrochloric acid, and then hydrogenated by the procedure described in Example 15 to yield 2-methyl-5-(3-oxobutyl)-1,2 - (3' - oxocyclopentano)perhydronaphthylen-6-one.

Repeating this procedure with the other corresponding 2,2 - ethylenedioxy - 1 - (lower)alkyl-5-oxocyclopent-1-ylpropionates produced in Example 1 yields the corresponding 7a-(lower)alkyl compounds.

EXAMPLE 18

Repeating the procedure of Example 7 but replacing methyl 2,2-ethylenedioxy - 1 - methyl - 5 - oxocyclopent-1-ylpropionate with methyl 2-methoxy-1-methyl-5-oxocyclopent-1-ylpropionate,
methyl 2-ethoxy-1-methyl-5-oxocyclopent-1-
methyl 1-methyl-5-oxo-2-(tetrahydropyran-2-yloxy) cyclopent-1-ylpropionate,
methyl 2-(t-butoxy)-1-methyl-5-oxocyclopent-1-ylpropionate, and
methyl 2-(4-methoxytetrahydropyran-4-yloxy)-1-methyl-5-oxo-cyclopent-1-ylpropionate, yields the corresponding 1-methoxy-7a-methyl-5,6,7,7a-tetrahydroindan-5-one,
1-ethoxy-7a-methyl-5,6,7,7a-tetrahydroindan-5-one,
7a-methyl-1-(tetrahydropyran-2-yloxy)-5,6,7,7a-tetrahydroindan-5-one,
1-(t-butoxy)-7a-methyl-5,6,7,7a-tetrahydroindan-5-one, and
1-(4-methoxytetrahydropyran-4-yloxy)-7a-methyl-5,6,7,7a-tetrahydroindan-5-one, respectively.

The 2-ethers used in this precedure are prepared as follows: A solution of 200 mg. of sodium 1-methyl-2,5-dioxocyclopent-1-yl propionate in 32 ml. of anhydrous isopropanol and 25 mg. of sodium borohydride is stirred at room temperature for 15 hours. 100 ml. of water is added, and the resulting suspension extracted several times with ether. The ether phase is dried over sodium sulfate and evaporated to dryness under reduced pressure to yield sodium 2 - hydroxy - 1-methyl-5-oxocyclopent-1-ylpropionate, which may be further purified by recrystallization from ether.

To a solution of 0.1 g. moles of sodium 2-hydroxy-1-methyl-5-oxocyclopent-1-ylpropionate in 200 ml. of methanol, 15.5 g. of methyl iodide and 14 g. of potassium carbonate is added. The mixture is stirred overnight, diluted with water and extracted with ether. The ether phase is dried over sodium sulfate and evaporated to dryness under reduced pressure to yield methyl 2-hydroxy-1-methyl-5-oxocyclopent-1-ylpropionate.

To a solution of 1 g. of methyl 2-hydroxy-1-methyl-5-oxocyclopent-1-ylpropionate in 25 ml. of DMF is added 3 molar equivalents of methyl iodide and 2 molar equivalents of silver oxide. The mixture is maintained at room temperature for 12 hours, filtered, evaporated under reduced pressure to yield methyl 2 - methoxy - 1 - methyl-5-oxocyclopent - 1 - ylpropionate which is recrystallized from chloroform:methanol. Repeating this procedure with ethyl iodide yields methyl 2-ethoxy-1-methyl-5-oxocyclopent-1-ylpropionate.

Two milliliters of dihydropyran are added to a solution of 1 g. of methyl 2-hydroxy-1-methyl-5-oxocyclopent-1-ylpropionate in 15 ml. of benzene. About 1 ml. is removed by distillation to remove moisture, and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield methyl 1 - methyl - 5-oxo-2-(tetrahydropyran-2-yloxy)-cyclopentylpropionate which is recrystallized from pentane.

Repeating the above procedure but replacing dihydropyran with 4 - methoxy - 5,6 - dihydro-2H-pyran yields methyl 1 - (4 - methoxy - tetrahydropyran-4-yloxy)-1-methyl - 5 - oxocyclopentylpropionate.

To a solution of 1 g. of methyl 2-hydroxy-1-methyl-5-oxo-cyclopent-1-ylpropionate in 25 ml. of methylene dichloride is added liquid isobutylene. A catalytic amount of concentrated sulfuric acid is added, and the mixture is agitated in a sealed bomb overnight at room temperature. The reaction mixture is then washed with aqueous sodium bicarbonate solution, evaporated, and recrystallized from chloroform:methanol to yield methyl 2 - (t-butoxy)-1-methyl-5-oxocyclopent-1-ylpropionate.

The invention claimed is:

1. A process for preparing 4-substituted-5,6,7,7a-tetrahydroindan-5-ones comprising reacting, under anhydrous conditions in an organic solvent inert to the reaction, a 2-oxo-1-cyclopentylpropionic acid derivative and a carbanion generated in situ by reacting a phosphonate with a base, at least two molar equivalents of said phosphonate being present for each mole of said 2-oxo-1-cyclopentylpropionic acid derivative, the 2-oxo-1-cyclopentylpropionic acid derivative being selected from the group of compounds represented by the formula

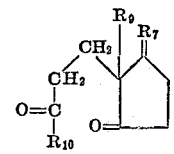

wherein $R_7$ is a lower alkylenedioxy or

wherein $OR_8$ is a lower alkoxy, tetrahydropyran-2-yloxy, tetrahydrofuran-2-yloxy or 4-methoxytetrahydropyran-4-yloxy; $R_9$ is lower alkyl; and $R_{10}$ is lower alkoxy, aryloxy having up to 10 carbons, lower alkylthio, lower alkanoyloxy, bromo or chloro, the phosphonate being selected from the group represented by the formulas

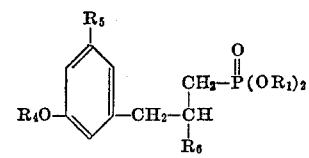

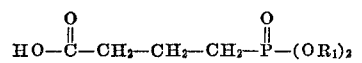

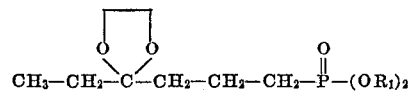

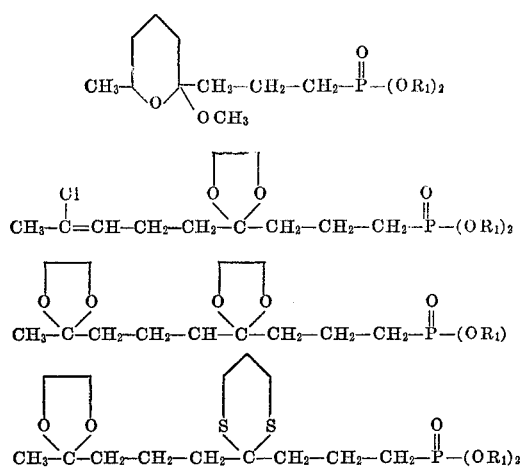

wherein $R_4$ is an alkaline-stable, acid-labile protecting group, $R_5$ is hydrogen or lower alkoxy, $R_6$ is hydrogen or methyl, and $R_1$ is selected from the group consisting of substituted and unsubstituted, saturated and unsaturated, aliphatic and carbocyclic radicals and lower alkoxy radicals, and the base being selected from the group represented by alkyl lithium, aryl lithium, alkyl sodium, aryl sodium, alkyl potassium, aryl potassium, alkali metal hydrides and alkali metal amides.

2. The process of claim 1 wherein the phosphonate has the formula

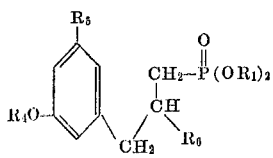

wherein $R_4$ is a lower alkyl, tetrahydropyran-2'-yl, tetrahydrofuran-2'-yl or 4'-methoxytetrahydropyran-4'-yl group, $R_5$ is hydrogen or lower alkoxy, $R_6$ is hydrogen or methyl, and $R_1$ is selected from the group consisting of substituted and unsubstituted, saturated and unsaturated, aliphatic and carbocyclic radicals and lower alkoxy radicals.

3. The process of claim 1 wherein the phosphonate is selected from the group of compounds having the formulas

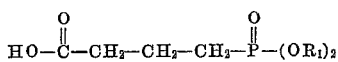

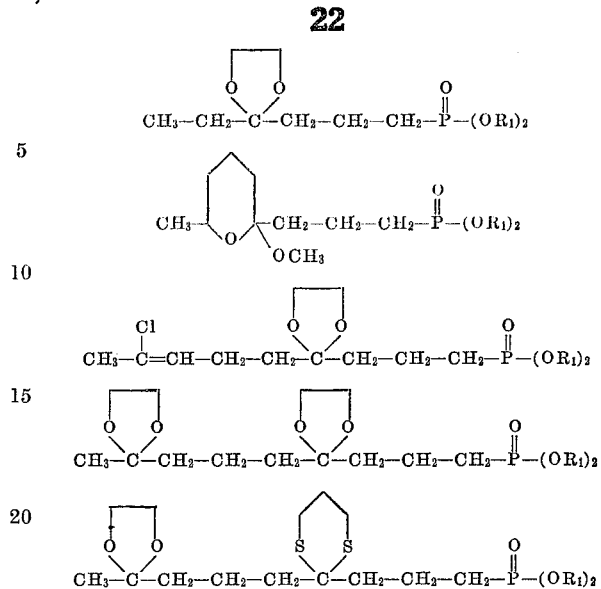

4. The process of claim 1 including the step of adding a lower monohydric aliphatic alcohol and an alkali metal alkoxide or alkaline earth metal alkoxide base to the reaction mixture subsequent to the substantial disappearance of said carbanion, and thereafter maintaining the reaction mixture at a temperature of from room temperature to reflux temperature.

5. The process of claim 1 including the step of adding a dipolar aprotic solvent to the reaction mixture subsequent to the substantial disappearance of said carbanion, and thereafter maintaining the reaction mixture at a temperature of from room temperature to reflux temperature.

6. The process of claim 5 wherein the dipolar aprotic solvent is hexamethylphosphoramide, and the reaction mixture is maintained at reflux temperature.

7. The process of claim 3 wherein said organic solvent is diglyme, and the reaction mixture is maintained at reflux temperature.

References Cited
UNITED STATES PATENTS 3,592,838    7/1971    Shaw, et al. _____ 260—468.5

HENRY R. JILES, Primary Examiner

C. M. SHURKO, Assistant Examiner

U.S. Cl. X.R.

260—340.9, 345.7, 345.8, 345.9, 347.2, 347.3, 347.4, 347.8, 397.5, 456, 469, 473 G, 514 R, 544 L, 546